United States Patent
Chen et al.

(10) Patent No.: US 12,425,322 B2
(45) Date of Patent: Sep. 23, 2025

(54) MEASUREMENT METHOD, CONFIGURATION METHOD AND DEVICE

(71) Applicant: VIVO MOBILE COMMUNICATION CO., LTD., Guangdong (CN)

(72) Inventors: Li Chen, Chang'an Dongguan (CN); Xueming Pan, Chang'an Dongguan (CN); Dajie Jiang, Chang'an Dongguan (CN); Kai Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 503 days.

(21) Appl. No.: 17/181,451

(22) Filed: Feb. 22, 2021

(65) Prior Publication Data
US 2021/0185551 A1 Jun. 17, 2021

Related U.S. Application Data

(63) Continuation of application No. PCT/CN2019/100529, filed on Aug. 14, 2019.

(30) Foreign Application Priority Data

Aug. 20, 2018 (CN) .......................... 201810949203.3

(51) Int. Cl.
*H04L 43/16* (2022.01)
*H04W 24/08* (2009.01)
(Continued)

(52) U.S. Cl.
CPC ............ *H04L 43/16* (2013.01); *H04W 24/08* (2013.01); *H04W 36/0061* (2013.01); *H04W 52/0212* (2013.01); *H04L 41/0893* (2013.01)

(58) Field of Classification Search
None
See application file for complete search history.

(56) References Cited

U.S. PATENT DOCUMENTS

8,521,167 B2 * 8/2013 Magadi Rangaiah ...................... H04W 48/20 455/438
8,630,647 B2 * 1/2014 Magadi Rangaiah ...................... H04W 48/20 455/437

(Continued)

FOREIGN PATENT DOCUMENTS

CN 101742530 A 6/2010
CN 104168630 A 11/2014
(Continued)

OTHER PUBLICATIONS

JP Office Action in Application No. 2021-510133 Dated Apr. 19, 2022.
(Continued)

*Primary Examiner* — Clemence S Han
(74) *Attorney, Agent, or Firm* — Price Heneveld LLP

(57) ABSTRACT

A measurement method, a configuration method, and a device are provided. The measurement method comprises: receiving a threshold value of a measurement quantity configured by a network device; when a value of the measurement quantity of a cell or a neighboring cell at which a terminal located and the threshold value of the measurement quantity satisfy a first condition, determining to measure and/or track a target neighboring cell corresponding to the first condition.

13 Claims, 3 Drawing Sheets

(51) Int. Cl.
H04W 36/00 (2009.01)
H04W 52/02 (2009.01)
*H04L 41/0893* (2022.01)

(56) References Cited

U.S. PATENT DOCUMENTS

| | | | |
|---|---|---|---|
| 9,445,337 B2* | 9/2016 | Hole | H04W 48/20 |
| 2007/0223510 A1 | 9/2007 | Joo | |
| 2012/0113859 A1* | 5/2012 | Jung | H04W 24/10 |
| | | | 370/252 |
| 2012/0122458 A1* | 5/2012 | Jokinen | H04W 36/08 |
| | | | 455/437 |
| 2013/0029666 A1* | 1/2013 | Jung | H04W 36/0085 |
| | | | 455/436 |
| 2013/0045735 A1* | 2/2013 | Kim | H04W 24/10 |
| | | | 455/422.1 |
| 2013/0137473 A1 | 5/2013 | Watanabe et al. | |
| 2013/0223235 A1* | 8/2013 | Hu | H04W 36/30 |
| | | | 370/242 |
| 2013/0267221 A1 | 10/2013 | Srinivasan et al. | |
| 2014/0086173 A1* | 3/2014 | Sadeghi | H04W 68/02 |
| | | | 370/328 |
| 2014/0228030 A1* | 8/2014 | Jung | H04W 36/0088 |
| | | | 455/436 |
| 2015/0189560 A1 | 7/2015 | Ji | |
| 2015/0208353 A1* | 7/2015 | Jung | H04W 52/0254 |
| | | | 455/574 |
| 2016/0080963 A1* | 3/2016 | Marinier | H04J 11/005 |
| | | | 370/252 |
| 2016/0088529 A1 | 3/2016 | Yoon | |
| 2016/0255565 A1* | 9/2016 | Kim | H04W 36/0058 |
| | | | 370/331 |
| 2016/0316411 A1* | 10/2016 | Jung | H04W 24/08 |
| 2016/0360462 A1* | 12/2016 | Chockalingam | H04W 36/0058 |
| 2016/0374000 A1* | 12/2016 | Kim | H04W 48/20 |
| 2017/0013551 A1* | 1/2017 | Martin | H04L 43/16 |
| 2017/0078930 A1 | 3/2017 | Kazmi et al. | |
| 2017/0171786 A1* | 6/2017 | Mochizuki | H04W 48/20 |
| 2018/0035342 A1* | 2/2018 | Fujishiro | H04W 36/0085 |
| 2018/0041936 A1* | 2/2018 | Kim | H04W 72/51 |
| 2018/0049087 A1 | 2/2018 | Lee et al. | |
| 2018/0192426 A1* | 7/2018 | Ryoo | H04W 72/0453 |
| 2018/0242208 A1* | 8/2018 | Ku | H04W 48/20 |
| 2018/0288666 A1* | 10/2018 | Fujishiro | H04W 48/20 |
| 2018/0323884 A1* | 11/2018 | Ku | H04W 24/08 |
| 2019/0246325 A1* | 8/2019 | Lee | H04W 48/16 |
| 2019/0254110 A1* | 8/2019 | He | H04L 5/0048 |
| 2019/0319686 A1* | 10/2019 | Chen, IV | H04B 7/0639 |
| 2019/0349825 A1* | 11/2019 | Tseng | H04W 48/20 |
| 2019/0386757 A1* | 12/2019 | Li | H04B 7/088 |
| 2019/0387443 A1 | 12/2019 | Huang et al. | |
| 2021/0084583 A1* | 3/2021 | Niu | H04W 48/20 |

FOREIGN PATENT DOCUMENTS

| | | |
|---|---|---|
| CN | 104581840 A | 4/2015 |
| CN | 107820718 A | 3/2018 |
| JP | 2015514377 A | 5/2015 |
| KR | 20160035956 A | 4/2016 |
| WO | 2012032886 A1 | 3/2012 |
| WO | 2014040277 A1 | 3/2014 |
| WO | 2015020179 A1 | 2/2015 |
| WO | 2016165670 A1 | 10/2016 |

OTHER PUBLICATIONS

KR Office Action in Application No. 10-2021-7008348 Dated Apr. 14, 2022.
CN Office Action in Application No. 201810949203.3 dated Sep. 17, 2020.
Written Opinion and International Search Report in Application No. PCT/CN2019/100529 dated Mar. 4, 2021.
"Relaxed monitoring" 3GPP TSG-RAN WG2 Meeting #99, R2-1708316, Huawei, HiSilicon, Neul, Aug. 21, 2017.
EP Search Report in Application No. 19851161.0 dated Oct. 18, 2021.
"Inter-RAT cell reselection" TSG-RAN Working Group 2 (Radio layer 2 and Radio layer 3), R2-000477, Nokia, Feb. 28, 2000.
EP Office Action dated Apr. 5, 2023 as received in Application No. 19851161.0.

* cited by examiner

MEASUREMENT METHOD, CONFIGURATION METHOD AND DEVICE

CROSS REFERENCE TO RELATED APPLICATIONS

This application is continuation application of PCT International Application No. PCT/CN2019/100529 filed on Aug. 14, 2019, which claims priority to Chinese Patent Application No. 201810949203.3 filed on Aug. 20, 2018 in China, the disclosures of which are incorporated in their entireties by reference herein.

TECHNICAL FIELD

Embodiments of the present disclosure relate to the field of communications technologies, and specifically, to a measurement method, a configuration method, a terminal, and a device.

BACKGROUND

In a long term evolution (LTE) system, the idle state protocol defines configuration related to idle state measurement and a condition for triggering neighboring cell measurement.

A terminal chooses not to perform neighboring cell measurement when a serving cell meets the following requirements: Cell selection received signal strength value ($S_{rxlev}$)>Intra-frequency measurement start reference signal received power (RSRP) threshold ($S_{IntraSearchP}$), and Cell selection signal quality value ($S_{qual}$)>Intra-frequency measurement start reference signal received power (RSRQ) threshold ($S_{IntraSearchQ}$). Otherwise, if the value is lower than the threshold, the terminal needs to perform neighboring cell measurement.

The foregoing neighboring cell measurement thresholds may be configured by a network side. When they have not been configured by the network side, the protocol stipulates that when a measurement result of a current cell does not meet criterion S for multiple consecutive times, neighboring cell measurement will be triggered.

However, related threshold configuration manners cause the terminal to measure and/or track a neighboring cell for a plurality of times, which goes against power saving of the terminal.

SUMMARY

An object of the embodiments of the present disclosure is to provide a measurement method, a configuration method, and a device, so as to solve a problem of an excessive number of times of neighboring cell measurement and/or tracking performed by a terminal.

According to a first aspect, an embodiment of the present disclosure provides a measurement method, applied to a terminal. The method includes:
 receiving a threshold of a measurement quantity configured by a network device; and
 determining to measure and/or track a target neighboring cell corresponding to a first condition when the threshold of the measurement quantity and a value of a measurement quantity of a cell in which the terminal is located or a neighboring cell meet the first condition.

According to a second aspect, an embodiment of the present disclosure further provides a configuration method, applied to a network device. The method includes:
 configuring a threshold of a measurement quantity for a terminal, so that the terminal determines to measure and/or track a target neighboring cell corresponding to a first condition when the threshold of the measurement quantity and a value of a measurement quantity of a cell in which the terminal is located or a neighboring cell meet the first condition.

According to a third aspect, an embodiment of the present disclosure further provides a terminal, including:
 a receiving module, configured to receive a threshold of a measurement quantity configured by a network device; and
 a processing module, configured to determine to measure and/or track a target neighboring cell corresponding to a first condition when the threshold of the measurement quantity and a value of a measurement quantity of a cell in which the terminal is located or a neighboring cell meet the first condition.

According to a fourth aspect, an embodiment of the present disclosure further provides a network device, including:
 a configuration module, configured to configure a threshold of a measurement quantity for a terminal, so that the terminal determines to measure and/or track a target neighboring cell corresponding to a first condition when the threshold of the measurement quantity and a value of a measurement quantity of a cell in which the terminal is located or a neighboring cell meet the first condition.

According to a fifth aspect, an embodiment of the present disclosure provides a terminal, including: a processor, a memory, and a program stored in the memory and executable on the processor. The program, when executed by the processor, implements the steps of the foregoing measurement method.

According to a sixth aspect, an embodiment of the present disclosure provides a network device, including: a processor, a memory, and a program stored in the memory and executable on the processor. The program, when executed by the processor, implements the steps of the foregoing configuration method.

According to a seventh aspect, an embodiment of the present disclosure further provides a computer readable storage medium. The computer readable storage medium stores a computer program. The computer program, when executed by a processor, implements the steps of the foregoing measurement method or the steps of the foregoing configuration method.

The embodiments of the present disclosure can reduce a number of times of neighboring cell measurement and/or tracking performed by a terminal, so as to achieve an objective of power saving.

BRIEF DESCRIPTION OF DRAWINGS

It becomes clear for a person of ordinary skill in the art to learn various other advantages and benefits by reading detailed description of the following optional implementation manners. The accompanying drawings are merely used for showing the optional implementation manners, and are not considered as a limitation on the present disclosure. In all the accompanying drawings, a same reference symbol is used to indicate a same part. In the accompanying drawings.

DESCRIPTION OF EMBODIMENTS

Figure 1:
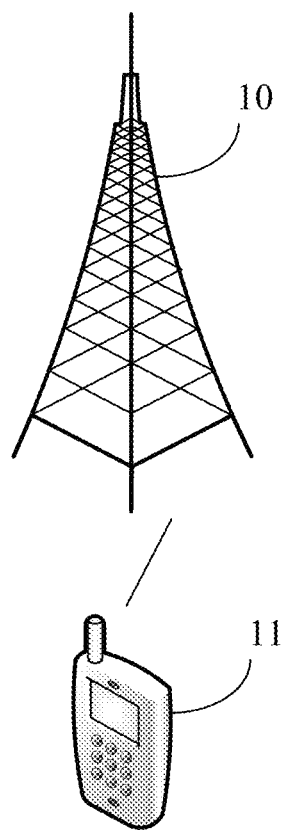
FIG. 1 is a schematic architectural diagram of a wireless communications system according to an embodiment of the present disclosure.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The term "include" and any other variants in the specification and claims of this application are intended to cover a non-exclusive inclusion, for example, a process, method, system, product, or device that includes a list of steps or units is not necessarily limited to those expressly listed steps or units, but may include other steps or units not expressly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the word such as "exemplary" or "example" is used to represent giving an example, an illustration, or a description. Any embodiment or design scheme described as an "exemplary" or "example" in the embodiments of the present disclosure should not be explained as being more preferred or having more advantages than another embodiment or design scheme. Exactly, use of the word such as "exemplary" or "example" is intended to present a concept in a specific manner.

Technologies described herein are not limited to a long time evolution (LTE)/LTE-advanced (LTE-A) system, and can also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems.

The terms "system" and "network" are often used interchangeably. The CDMA system can implement radio technologies such as CDMA2000 and Universal Terrestrial Radio Access (UTRA). UTRA includes wideband CDMA (WCDMA) and other CDMA variants. The TDMA system can implement radio technologies such as a global system for mobile communications (GSM). The OFDMA system can implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. UTRA and E-UTRA are a part of the universal mobile telecommunications system (UMTS). LTE and more advanced LTE (such as LTE-A) are new UMTS versions that use E-UTRA. UTRA, E-UTRA, UMTS, LTE, LTE-A, and GSM are described in documents of the organization named "3rd Generation Partnership Project (3GPP)". CDMA2000 and UMB are described in documents of the organization named "3rd Generation Partnership Project 2 (3GPP2)". The technology described herein can be used in the above-mentioned systems and radio technologies as well as other systems and radio technologies.

The following describes the embodiments of the present disclosure with reference to the accompanying drawings. A measurement method, configuration method, and device provided in the embodiments of the present disclosure can be applied to a wireless communications system. FIG. 1 is a schematic structural diagram of a wireless communications system according to an embodiment of the present disclosure. As shown in FIG. 1, the wireless communications system may include a network device 10 and a terminal. The terminal is denoted as user equipment (UE) 11, and the UE 11 may communicate with the network device 10 (transmit signaling or data). In actual application, a connection between the devices is a wireless connection. For ease of visual indication of a connection relationship between the devices, solid lines are used for illustration in FIG. 1. It should be noted that the foregoing communications system can include a plurality of UEs 11, and the network device 10 can communicate with plurality of UEs 11.

The terminal provided in this embodiment of the present disclosure can be a mobile phone, a tablet computer, a laptop, an ultra-mobile personal computer (UMPC), a netbook, or personal digital assistant (PDA), a mobile Internet device (MID), a wearable device (Wearable Device), an in-vehicle device, or the like.

The network device 10 provided in this embodiment of the present disclosure may be a base station, and the base station may be a commonly used base station, or may be an evolved nodeB (evolved node base station, eNB), or may be a device such as a network device (for example, a next generation nodeB (next generation node base station, gNB) or a transmission and reception point (TRP)) in a 5G system.

Figure 2:
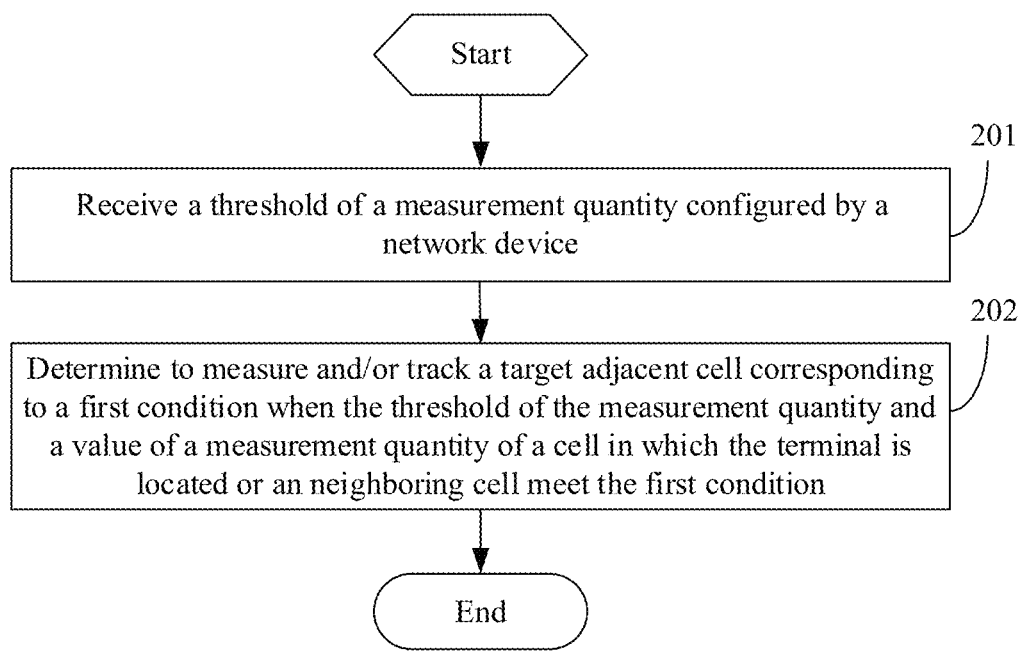
FIG. 2 is a flowchart of a measurement method according to an embodiment of the present disclosure.

Referring to FIG. 2, an embodiment of the present disclosure provides a measurement method. The method can be performed by a terminal, and specific steps are as follows.

Step 201: Receive a threshold of a measurement quantity configured by a network device.

It should be noted that the threshold of the measurement quantity configured by the network device includes: a one-level threshold of the measurement quantity or a multi-level threshold of the measurement quantity, where the multi-level threshold of the measurement quantity is equivalent to a plurality of different thresholds of the measurement quantity. The multi-level threshold of the measurement quantity is configured, so that accuracy in determining neighboring cell measurement and/or tracking (tracking) can be improved, and a number of times of neighboring cell measurement by the terminal can be reduced.

Optionally, the one-level threshold or multi-level threshold of the measurement quantity used for neighboring cell measurement and configured for the terminal is received by using information carried in a broadcast message, a system message (for example, a system information block (SIB)), a dedicated radio resource control (RRC) message (for example, an RRC release (release) or RRC suspend (suspend) message) or a physical downlink control channel (PDCCH).

It should be noted that this embodiment of the present disclosure can be applied to an inter-frequency (inter-frequency) or inter-RAT (Inter-RAT) scenario. For example, in step 201, when a priority of an inter-RAT (inter-RAT) frequency and/or a priority of an adjacent frequency are/is higher than a priority of a frequency of a cell in which the terminal is located, the one-level threshold or multi-level threshold of the measurement quantity configured by the network device is received.

The multi-level threshold of the measurement quantity means a plurality of thresholds of the measurement quantity. A number of the plurality of thresholds of the measurement quantity can be at least two. For example, the multi-level threshold of measurement quantity includes a first-level threshold and a second-level threshold, or a first-level threshold, a second-level threshold, and a third-level threshold, or a first-level threshold, a second-level threshold, a third-level threshold, and a fourth-level threshold. It can be understood that in this embodiment of the present disclosure, the multi-level threshold of the measurement quantity is not specifically limited.

The measurement quantity (measurement quantity) can also be referred to as a measurement performance value, and the measurement quantity indicates at least one of a signal to interference plus noise ratio (SINR), reference signal received power (RSRP), and reference signal received quality (RSRQ).

Step 202: Determine to measure and/or track (tracking) a target neighboring cell corresponding to a first condition when the threshold of the measurement quantity and a value of a measurement quantity of a cell in which the terminal is located or a neighboring cell meet the first condition.

The cell in which the terminal is located includes a serving cell or a camped cell.

Optionally, prior to step 202, the method further includes: receiving information that is related to a preset number of neighboring cells and/or a preset neighboring cell group that is configured by the network device. For example, the information that is related to the preset number of neighboring cells and/or the preset neighboring cell group and that is configured by network device is received by using information carried in a broadcast message, a system message, a dedicated RRC message, or a PDCCH.

For example, the information related to the preset number of neighboring cells or the preset neighboring cell group is used to explicitly or implicitly indicate the preset number of neighboring cells or the preset neighboring cell group, where each preset neighboring cell group may include one or more neighboring cells.

By means of dividing, the preset neighboring cell group may include: a first neighboring cell group, or a first neighboring cell group and a second neighboring cell group, or a first neighboring cell group, a second neighboring cell group, and the third neighboring cell group, or the like. In this embodiment of the present disclosure, there is no specific limitation on a specific manner of dividing the preset neighboring cell group.

Optionally, after step 202, the method may further include: searching (search) for the target neighboring cell (that is, attempting (attempt) to search for the target neighboring cell), and measuring all or a first preset number of target neighboring cells found through searching, without attempting to search or measure a neighboring cell other than the target neighboring cell.

In this embodiment of the present disclosure, optionally, the threshold of the measurement quantity includes at least one of the following: a first threshold, a second threshold, and a third threshold.

The first condition may include at least one of the following:

the value of the measurement quantity of the cell in which the terminal is located is less than the first threshold;
the value of the measurement quantity of the neighboring cell is greater than the second threshold; and
a number of neighboring cells whose values of a corresponding measurement quantity are greater than the third threshold is greater than a second preset number, where
the target neighboring cell may include at least one of the following:
a neighboring cell in a preset first neighboring cell group;
a neighboring cell whose value of a corresponding measurement quantity is greater than the second threshold or the third threshold; and
a third preset number of neighboring cells.

It should be noted that this embodiment of the present disclosure does not impose specific limitation on the first threshold, the second threshold, the third threshold, the first preset number, the second preset number and the third preset number.

In this embodiment of the present disclosure, optionally, the threshold of the measurement quantity may include at least one of the following: a fourth threshold, a fifth threshold, a sixth threshold, a seventh threshold, and an eighth threshold.

The first condition may include at least one of the following: the value of the measurement quantity of the cell in which the terminal is located is less than the fourth threshold;
the value of the measurement quantity of the neighboring cell is greater than the fifth threshold;
a number of neighboring cells whose values of a corresponding measurement quantity are greater than the sixth threshold is greater than a fourth preset number;
a value of a measurement quantity of a currently measured or tracked neighboring cell is less than the seventh threshold; and
a value of a measurement quantity of the neighboring cell in the preset first neighboring cell group is less than the eighth threshold, where
the target neighboring cell may include at least one of the following:
a neighboring cell in a preset second neighboring cell group;
a neighboring cell whose value of a corresponding measurement quantity is greater than the fifth threshold or the sixth threshold; and
a fifth preset number of neighboring cells.

It should be noted that this embodiment of the present disclosure does not impose specific limitation on the fourth threshold, the fifth threshold, the sixth threshold, the seventh threshold, the eighth threshold, the fourth preset number, and the fifth preset number.

In this embodiment of the present disclosure, optionally, the first threshold is greater than the fourth threshold, the second threshold is greater than the fifth threshold, and the third threshold is greater than the sixth threshold; or
the first threshold is less than the fourth threshold, the second threshold is less than the fifth threshold, and the third threshold is less than the sixth threshold.

For example, the multi-level threshold of the measurement quantity is a two-level threshold of the measurement quantity. Optionally, the two-level threshold of the measurement quantity may include at least one of the first threshold, the second threshold, and the third threshold, and at least one of the fourth threshold, the fifth threshold, the sixth threshold, the seventh threshold, and the eighth threshold.

For example, the two-level threshold of the measurement quantity includes: the first threshold (the first-level threshold) and the fourth threshold (the second-level threshold), where the first threshold is 2 dB, the fourth threshold is 6 dB, and the value of the measurement quantity of the cell in which the terminal is located is 4 dB. In this case, the value of the measurement quantity of the cell in which the terminal is located is less than the fourth threshold, and the target neighboring cell may be the neighboring cell in the preset second neighboring cell group.

It can be understood that the foregoing description merely takes the multi-level threshold of the measurement quantity including the first-level threshold and the second-level threshold as an example. If the multi-level threshold of the measurement quantity further includes the third-level threshold or another-level threshold, a manner of setting the third-level threshold or another-level threshold is similar to the manner of setting the setting mode of the first-level threshold and the second-level threshold. Details are not described herein again.

In this embodiment of the present disclosure, optionally, that the value of the measurement quantity of the neighboring cell is greater than the second threshold or the fifth threshold includes at least one of the following:

values of a measurement quantity of a sixth preset number or all of neighboring cells in a neighboring cell list configured by a network are greater than the second threshold or the fifth threshold;

a number of neighboring cells whose values of a corresponding measurement quantity are greater than the second threshold or the fifth threshold is greater than the seventh preset number;

in a first preset time, values of a measurement quantity of an eighth preset number or all of neighboring cells in a neighboring cell list configured by a network are greater than the second threshold or the fifth threshold; and in a second preset time, a number of neighboring cells whose values of a corresponding measurement quantity are greater than the second threshold or the fifth threshold is greater than a ninth preset number.

It should be noted that this embodiment of the present disclosure does not impose specific limitation on the first preset time, the second preset time, the sixth preset number, the seventh preset number, the eighth preset number, and the ninth preset number.

In this embodiment of the present disclosure, optionally, that the value of the measurement quantity of the neighboring cell is less than the seventh threshold or the eighth threshold includes at least one of the following:

values of a measurement quantity of a tenth preset number or all of neighboring cells in a neighboring cell list configured by a network are less than the seventh threshold or the eighth threshold;

a number of neighboring cells whose values of a corresponding measurement quantity are less than the seventh threshold or the eighth threshold is greater than an eleventh preset number;

in a third preset time, values of a measurement quantity of a twelfth preset number or all of neighboring cells in a neighboring cell list configured by a network are less than the seventh threshold or the eighth threshold; and in a fourth preset time, a number of neighboring cells whose values of a corresponding measurement quantity are less than the seventh threshold or the eighth threshold is greater than a thirteenth preset number.

It should be noted that this embodiment of the present disclosure does not impose specific limitation on the third preset time, the fourth preset time, the tenth preset number, the eleventh preset number, the twelfth preset number, and the thirteenth preset number.

In this embodiment of the present disclosure, a number of times of neighboring cell measurement and/or tracking performed by the terminal can be reduced, thereby achieving an objective of power saving.

Figure 3:
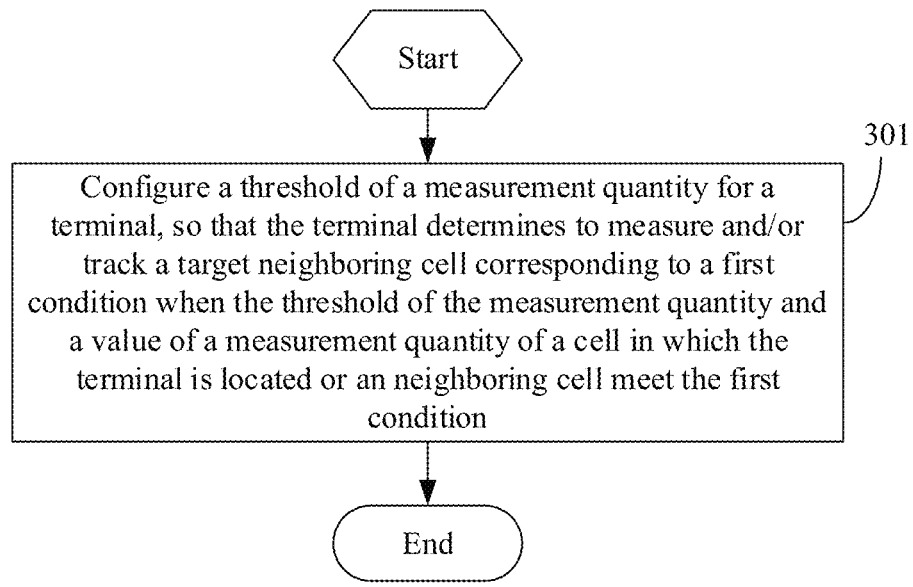
FIG. 3 is a flowchart of a configuration method according to an embodiment of the present disclosure.

Referring to FIG. 3, an embodiment of the present disclosure provides a configuration method. The method can be performed by a network device, and specific steps are as follows.

Step 301: Configure a threshold of a measurement quantity for a terminal, so that the terminal determines to measure and/or track a target neighboring cell corresponding to a first condition when the threshold of the measurement quantity and a value of a measurement quantity of a cell in which the terminal is located or a neighboring cell meet the first condition.

The measurement quantity (measurement quantity) can also be referred to as measurement performance, and the measurement quantity indicates at least one of a SINR, RSRP, and RSRQ. The threshold of the measurement quantity may be a one-level threshold of the measurement quantity or a multi-level threshold of the measurement quantity.

In this embodiment of the present disclosure, optionally, in step 301, the threshold of the measurement quantity for the terminal is configured by using information carried in a broadcast message, a system message, a dedicated RRC message, or a PDCCH.

In this embodiment of the present disclosure, optionally, before or after step 301, the method may further include: configuring information related to a preset number of neighboring cells and/or a preset neighboring cell group. For example, the information related to the preset number of neighboring cells and/or the preset neighboring cell group is configured by using information carried in a broadcast message, a system message, a dedicated RRC message, or a PDCCH.

It should be noted that for content, such as the threshold of the measurement quantity and the first condition, in the embodiment of the configuration method shown in FIG. 3, reference may be made to the embodiment of the measurement method shown in FIG. 2. Details are not described herein.

In this embodiment of the present disclosure, a number of times of neighboring cell measurement and/or tracking performed by the terminal can be reduced, thereby achieving an objective of power saving.

EXAMPLE 1

Step 1: A terminal receives an at-least-two-level threshold of a measurement quantity (measurement quantity) that is used for neighboring cell measurement and that is configured by a network device for the terminal by using information carried in a broadcast message, a system message (for example, system information block (SIB)), a dedicated radio resource control (RRC) message (for example, an RRC release (release) or RRC suspend (suspend) message), or a physical downlink control channel (PDCCH).

The measurement quantity may also be referred to as a measurement performance value. The measurement quantity indicates at least one of a SINR, RSRP, and RSRQ.

Optionally, the terminal receives information that is related to a preset number of cells and/or a preset neighboring cell group and that is configured for the terminal by using information carried in a broadcast message, a system message (for example, a SIB), a dedicated RRC message (for example, RRC release or RRC suspend), or a PDCCH.

Step 2: The terminal determines neighboring cell measurement and/or tracking (tracking) based on the received multi-level threshold of the measurement quantity and a value of a measurement quantity of a cell in which the terminal is located or a neighboring cell.

The cell in which the terminal is located includes a serving cell or a camped cell.

In step 2, when a first-level threshold of the multi-level threshold of the measurement quantity and the value of the measurement quantity of the cell in which the terminal is located or the neighboring cell meet a first condition, it is determined to measure and/or track a target neighboring cell, where the target neighboring cell corresponds to the first condition.

Optionally, after it is determined to measure and/or track the target neighboring cell, the method further includes: searching for the target neighboring cell (that is, attempting to search for the target neighboring cell), and measuring all or the first preset number of target neighboring cells found through searching.

It can be understood that no attempt is made to searching for or measuring a neighboring cell other than the target neighboring cell.

Optionally, the first-level threshold of the multi-level threshold of the measurement quantity includes at least one of the following: a first threshold, a second threshold, and a third threshold.

The first condition includes at least one of the following:
(1) the value of the measurement quantity of the cell in which the terminal is located is less than the first threshold;
(2) the value of the measurement quantity of the neighboring cell is greater than the second threshold; and
(3) a number of first neighboring cells is greater than a second preset number, where the first neighboring cell is a neighboring cell whose value of a measurement quantity is greater than the third threshold.

The second threshold may be the same as the third threshold, or the second threshold may be different from the third threshold.

Optionally, the target neighboring cell includes at least one of the following:
(1) a neighboring cell in a preset first neighboring cell group;
(2) a neighboring cell whose value of a corresponding measurement quantity is greater than the second threshold or the third threshold; and
(3) a third preset number of neighboring cells.

Optionally, a second-level threshold of the multi-level threshold of the measurement quantity includes at least one of the following: a fourth threshold, a fifth threshold, a sixth threshold, a seventh threshold, and an eighth threshold.

The first condition includes at least one of the following:
(1) the value of the measurement quantity of the cell in which the terminal is located is less than the fourth threshold;
(2) the value of the measurement quantity of the neighboring cell is greater than the fifth threshold;
(3) a number of second neighboring cells is greater than a fourth preset number, where the second neighboring cell is a neighboring cell whose value of a measurement quantity is greater than the sixth threshold;
(5) a value of a measurement quantity of a currently measured or tracked neighboring cell is less than the seventh threshold; and
(6) a value of a measurement quantity of the neighboring cell in the first neighboring cell group is less than the eighth threshold.

The fifth threshold may be the same as the sixth threshold, or the fifth threshold may be different from the sixth threshold.

Optionally, the target neighboring cell includes at least one of the following:
(1) a neighboring cell in a preset second neighboring cell group;
(2) a neighboring cell whose value of a corresponding measurement quantity is greater than the fifth threshold or the sixth threshold; and
(3) a fifth preset number of neighboring cells.

Alternatively, the first threshold is greater than the fourth threshold, the second threshold is greater than the fifth threshold, and the third threshold is greater than the sixth threshold; or the first threshold is less than the fourth threshold, the second threshold is less than the fifth threshold, and the third threshold is less than the sixth threshold.

It can be understood that the multi-level threshold of the measurement quantity may further include a third-level threshold and a fourth-level threshold. A specific implementation process is similar to the foregoing step 2, and details are not described herein again. To be specific, after the multi-level threshold of the measurement quantity is introduced, the foregoing step 2 can be continued, and neighboring cells in a neighboring cell list can be divided into a plurality of neighboring cell groups, namely, a third neighboring cell group and a fourth neighboring cell group.

Further, that the value of the measurement quantity of the neighboring cell is greater than the second threshold or the fifth threshold includes at least one of the following:
(1) values of a measurement quantity of a sixth preset number or all of neighboring cells in a neighboring cell list configured by a network are greater than the second threshold or the fifth threshold;
(2) a number of neighboring cells whose values of a corresponding measurement quantity are greater than the second threshold or the fifth threshold is greater than a seventh preset number;
(3) in a first preset time, values of a measurement quantity of an eighth preset number or all of neighboring cells in a neighboring cell list configured by a network are greater than the second threshold or the fifth threshold; and
(4) in a second preset time, a number of neighboring cells whose values of a corresponding measurement quantity are greater than the second threshold or the fifth threshold is greater than a ninth preset number.

Further, that the value of the measurement quantity of the neighboring cell is less than the seventh threshold or the eighth threshold includes at least one of the following:
(1) values of a measurement quantity of a tenth preset number or all of neighboring cells in a neighboring cell list configured by a network are less than the seventh threshold or the eighth threshold;
(2) a number of neighboring cells whose values of a corresponding measurement quantity are less than the seventh threshold or the eighth threshold is greater than an eleventh preset number;

(3) in a third preset time, values of a measurement quantity of a twelfth preset number or all of neighboring cells in a neighboring cell list configured by a network are less than the seventh threshold or the eighth threshold; and (4) in a fourth preset time, a number of neighboring cells whose values of a corresponding measurement quantity are less than the seventh threshold or the eighth threshold is greater than a thirteenth preset number.

EXAMPLE 2: INTER-FREQUENCY (INTER-FREQUENCY) OR INTER-RAT (INTER-RAT) SCENARIO

When a priority of an inter-RAT frequency and/or a priority of an adjacent frequency are/is higher than a priority of a first frequency, the technical solution in Example 1 is implemented to measure and/or track a neighboring cell, where the first frequency is a frequency of a cell in which a terminal is located.

It should be noted that for content in Example 2 that is the same as that Example 1, reference may be made to Example 1. Details are not described herein again.

An embodiment of the present disclosure further provides a terminal. A principle of solving a problem by the terminal is similar to that of the measurement method in the embodiment of the present disclosure. Therefore, for implementation of the terminal, reference may be made to the implementation of the method, and details are not repeated again.

Figure 4:
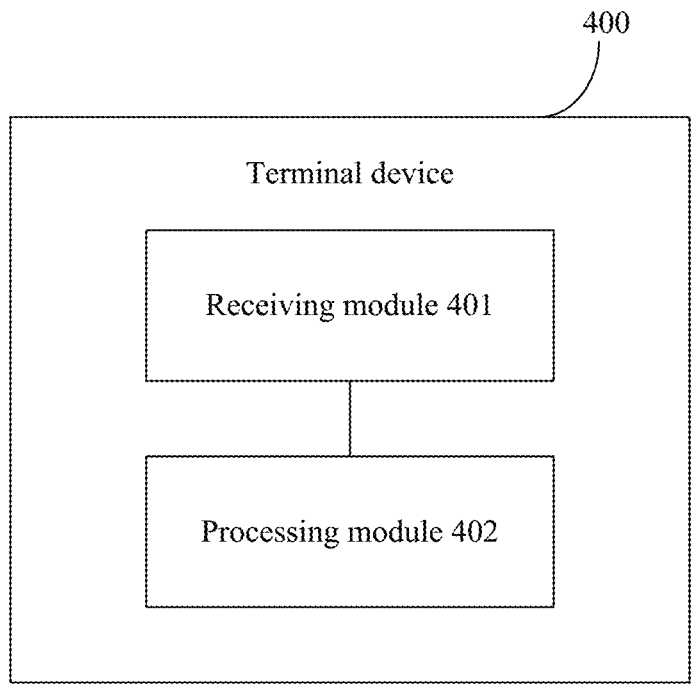
FIG. 4 is a first structural diagram of a terminal according to an embodiment of the present disclosure.

Referring to FIG. 4, an embodiment of the present disclosure provides a terminal. The terminal 400 includes:
a receiving module 401, configured to receive a threshold of a measurement quantity configured by a network device; and
a processing module 402, configured to determine to measure and/or track a target neighboring cell corresponding to a first condition when the threshold of the measurement quantity and a value of a measurement quantity of a cell in which the terminal is located or a neighboring cell meet the first condition.

In this embodiment of the present disclosure, optionally, the processing module 402 is further configured to: after it is determined to measure and/or track the target neighboring cell corresponding to the first condition, search for the target neighboring cell (that is, attempt to search for the target neighboring cell), and measure all or a first preset number of target neighboring cells found through searching.

In this embodiment of the present disclosure, optionally, the threshold of the measurement quantity includes at least one of the following: a first threshold, a second threshold, and a third threshold.

The first condition includes at least one of the following:
the value of the measurement quantity of the cell in which the terminal is located is less than the first threshold;
the value of the measurement quantity of the neighboring cell is greater than the second threshold; and
a number of neighboring cells whose values of a corresponding measurement quantity are greater than the third threshold is greater than a second preset number, where
the target neighboring cell includes at least one of the following:
a neighboring cell in a preset first neighboring cell group;
a neighboring cell whose value of a corresponding measurement quantity is greater than the second threshold or the third threshold; and
a third preset number of neighboring cells.

In this embodiment of the present disclosure, optionally, the threshold of the measurement quantity includes at least one of the following: a fourth threshold, a fifth threshold, a sixth threshold, a seventh threshold, and an eighth threshold.

The first condition includes at least one of the following:
the value of the measurement quantity of the cell in which the terminal is located is less than the fourth threshold;
the value of the measurement quantity of the neighboring cell is greater than the fifth threshold;
a number of neighboring cells whose values of a corresponding measurement quantity are greater than the sixth threshold is greater than a fourth preset number;
a value of a measurement quantity of a currently measured or tracked neighboring cell is less than the seventh threshold; and
a value of a measurement quantity of the neighboring cell in the preset first neighboring cell group is less than the eighth threshold, where
the target neighboring cell includes at least one of the following:
a neighboring cell in a preset second neighboring cell group;
a neighboring cell whose value of a corresponding measurement quantity is greater than the fifth threshold or the sixth threshold; and
a fifth preset number of neighboring cells.

In this embodiment of the present disclosure, optionally, the first threshold is greater than the fourth threshold, the second threshold is greater than the fifth threshold, and the third threshold is greater than the sixth threshold; or
the first threshold is less than the fourth threshold, the second threshold is less than the fifth threshold, and the third threshold is less than the sixth threshold.

In this embodiment of the present disclosure, optionally, that the value of the measurement quantity of the neighboring cell is greater than the second threshold or the fifth threshold includes at least one of the following:
values of a measurement quantity of a sixth preset number or all of neighboring cells in a neighboring cell list configured by a network are greater than the second threshold or the fifth threshold;
a number of neighboring cells whose values of a corresponding measurement quantity are greater than the second threshold or the fifth threshold is greater than a seventh preset number;
in a first preset time, values of a measurement quantity of an eighth preset number or all of neighboring cells in a neighboring cell list configured by a network are greater than the second threshold or the fifth threshold; and
in a second preset time, a number of neighboring cells whose values of a corresponding measurement quantity are greater than the second threshold or the fifth threshold is greater than a ninth preset number.

In this embodiment of the present disclosure, optionally, that the value of the measurement quantity of the neighboring cell is less than the seventh threshold or the eighth threshold includes at least one of the following:
values of a measurement quantity of a tenth preset number or all of neighboring cells in a neighboring cell list configured by a network are less than the seventh threshold or the eighth threshold;
a number of neighboring cells whose values of a corresponding measurement quantity are less than the seventh threshold or the eighth threshold is greater than an eleventh preset number;

in a third preset time, values of a measurement quantity of a twelfth preset number or all of neighboring cells in a neighboring cell list configured by a network are less than the seventh threshold or the eighth threshold; and in a fourth preset time, a number of neighboring cells whose values of a corresponding measurement quantity are less than the seventh threshold or the eighth threshold is greater than a thirteenth preset number.

In this embodiment of the present disclosure, optionally, the receiving module 401 is further configured to:

receive, by using information carried in a broadcast message, a system message, a dedicated radio resource control RRC message, or a physical downlink control channel PDCCH, the threshold of the measurement quantity configured by the network device.

In this embodiment of the present disclosure, optionally, the receiving module 401 is further configured to receive information that is related to a preset number of neighboring cells and/or a preset neighboring cell group and that is configured by the network device.

In this embodiment of the present disclosure, optionally, the receiving module 401 is further configured to receive, by using information carried in a broadcast message, a system message, a dedicated RRC message, or a PDCCH, the information that is related to the preset number of neighboring cells and/or the preset neighboring cell group and that is configured by network device.

In this embodiment of the present disclosure, optionally, the receiving module 401 is further configured to: when a priority of an inter-RAT frequency and/or a priority of an adjacent frequency are/is higher than a priority of a frequency of the cell in which the terminal is located, receive the threshold of the measurement quantity configured by the network device.

The terminal provided in this embodiment of the present disclosure may perform the foregoing method embodiment. An implementation principle and a technical effect of the terminal are similar to those of the method embodiment, and details are not described again in this embodiment.

An embodiment of the present disclosure further provides a network device. Because a problem-solving principle of the network device is similar to that of the measurement method in the embodiments of the present disclosure, for implementation of the network device, reference may be made to implementation of the method, and described are not repeated herein.

Figure 5:
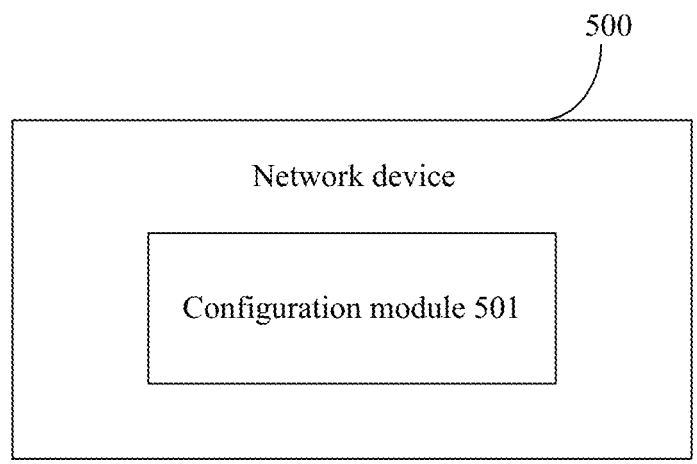
FIG. 5 is a first structural diagram of a network device according to an embodiment of the present disclosure.

Referring to FIG. 5, an embodiment of the present disclosure provides a network device. The network device 500 includes:

a configuration module 501, configured to configure a threshold of a measurement quantity for a terminal, so that the terminal determines to measure and/or track a target neighboring cell corresponding to a first condition when the threshold of the measurement quantity and a value of a measurement quantity of a cell in which the terminal is located or a neighboring cell meet the first condition.

In this embodiment of the present disclosure, the configuration module 501 is further configured to configure a multi-level threshold of the measurement quantity for the terminal by using information carried in a broadcast message, a system message, a dedicated RRC message, or a PDCCH.

In this embodiment of the present disclosure, optionally, the configuration module 501 is further configured to configure information related to a preset number of neighboring cells and/or a preset neighboring cell group.

In this embodiment of the present disclosure, the configuration module 501 is further configured to configure, by using information carried in a broadcast message, a system message, a dedicated RRC message, or a PDCCH, information related to a preset number of neighboring cells and/or a preset neighboring cell group.

The network device provided in this embodiment of the present disclosure may perform the foregoing method embodiment. An implementation principle and a technical effect of the network device are similar to those of the method embodiment, and details are not described again in this embodiment.

Figure 6:
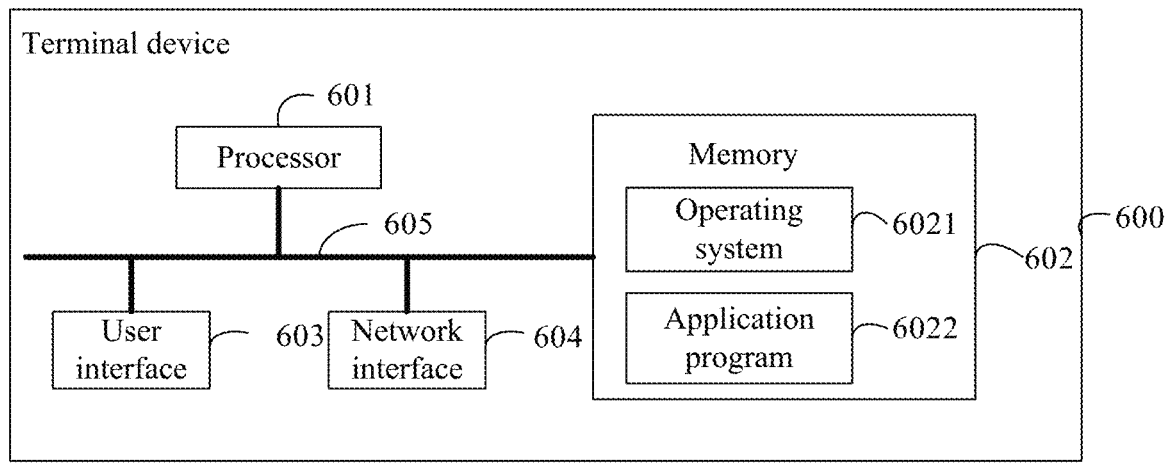
FIG. 6 is a second structural diagram of a terminal according to an embodiment of the present disclosure.

As shown in FIG. 6, a terminal 600 shown in FIG. 6 includes: at least one processor 601, a memory 602, at least one network interface 604, and a user interface 603. Various components of the terminal 600 are coupled by using a bus system 605. It may be understood that the bus system 605 is configured to implement a connection and communication between these components. In addition to a data bus, the bus system 605 may include a power bus, a control bus, and a status signal bus. However, for clarity of description, various buses are marked as the bus system 605 in FIG. 6.

The user interface 603 may include a display, a keyboard, or a clicking device, for example, a mouse, a trackball, a touch panel, or a touchscreen.

It may be understood that the memory 602 in this embodiment of the present disclosure may be a volatile memory or a nonvolatile memory, or may include both a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), and is used as an external cache. By way of example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data rate SDRAM, DDRSDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 602 in the system and the method that are described in this embodiment of the present disclosure is intended to include but is not limited to these memories and a memory of any other proper type.

In some implementations, the memory 602 stores the following element: an executable module or a data structure, a subset of an executable module or a data structure, or an extended set of an executable module or a data structure: an operating system 6021 and an application program 6022.

The operating system 6021 includes various system programs, for example, a framework layer, a kernel library layer, and a driver layer, and is configured to implement various basic services and process hardware-based tasks. The application program 6022 includes various application programs, for example, a media player (Media Player) and a browser (Browser), and is configured to implement various application services. A program for implementing the method in the embodiments of the present disclosure may be included in the application program 6022.

In an embodiment of the present disclosure, when executed, a program or instruction stored in the memory 602, which may be specifically a program or instruction stored in the application program 6022, implements the following steps: receiving a threshold of a measurement quantity configured by a network device; and determining to measure and/or track a target neighboring cell corresponding to a first condition when the threshold of the measurement quantity and a value of a measurement quantity of a cell in which the terminal is located or a neighboring cell meet the first condition.

The terminal provided in this embodiment of the present disclosure may perform the foregoing method embodiment. An implementation principle and a technical effect of the terminal are similar to those of the method embodiment, and details are not described again in this embodiment.

Figure 7:
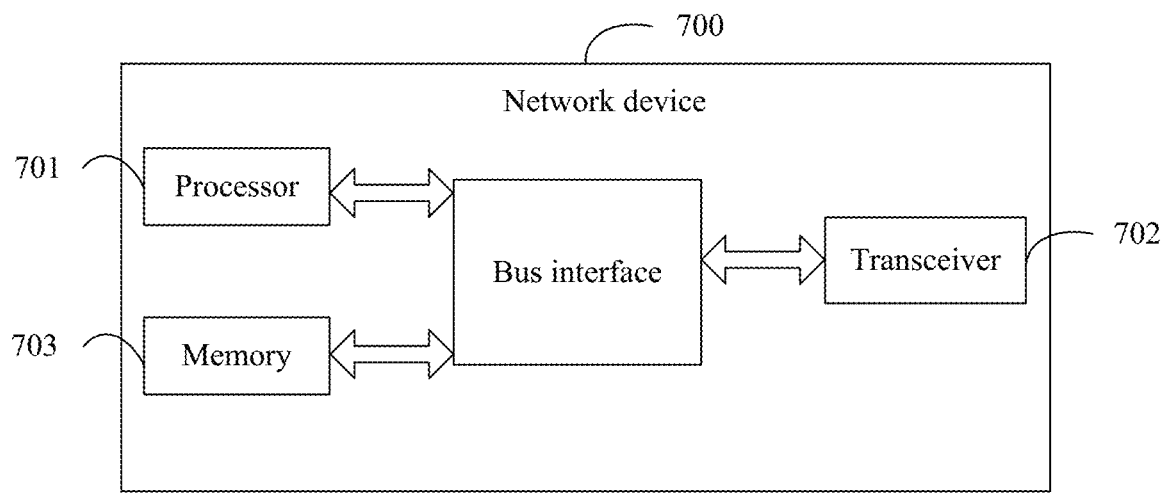
FIG. 7 is a second structural diagram of a network device according to an embodiment of the present disclosure.

Refer to FIG. 7. FIG. 7 is a structural diagram of a network device applied in an embodiment of the present disclosure. As shown in FIG. 7, the network device 700 includes a processor 701, a transceiver 702, a memory 703, and a bus interface.

In an embodiment of the present disclosure, the network device 700 further includes: a computer program stored in the memory 703 and capable of running on the processor 701. The computer program, when executed by the processor 701, implements the following steps: configuring a threshold of a measurement quantity for a terminal, so that the terminal determines to measure and/or track a target neighboring cell corresponding to a first condition when the threshold of the measurement quantity and a value of a measurement quantity of a cell in which the terminal is located or a neighboring cell meet the first condition.

In FIG. 7, the bus architecture may include any number of interconnected buses and bridges, which are specifically connected together by various circuits of one or more processors represented by the processor 701 and a memory represented by the memory 703. The bus architecture may further connect together various other circuits of a peripheral device, a voltage stabilizer, a power management circuit, and the like, which are known in this art and will not be further described herein. The bus interface provides an interface. The transceiver 702 may include a plurality of elements, that is, include a transmitter and a receiver, and provide units for communication with various other apparatuses on a transmission medium.

The processor 701 is responsible for managing the bus architecture and common processing, and the memory 703 may store data used when the processor 701 performs an operation.

The network device provided in this embodiment of the present disclosure may perform the foregoing method embodiment. An implementation principle and a technical effect of the network device are similar to those of the method embodiment, and details are not described again in this embodiment.

Method or algorithm steps described in combination with the content disclosed in the present disclosure may be implemented by hardware, or may be implemented by a processor by executing a software instruction. The software instruction may be formed by a corresponding software module. The software module may be stored in a RAM, a flash memory, a ROM, an EPROM, an EEPROM, a register, a hard disk, a removable hard disk, a read-only compact disc, or a storage medium of any other form known in the art. For example, a storage medium is coupled to the processor, so that the processor can read information from the storage medium or write information into the storage medium. Certainly, the storage medium may be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, improvement, or the like made on a basis of the technical solutions of the present disclosure shall fall within the protection scope of the present disclosure.

A person skilled in the art should understand that the embodiments of the present disclosure may be provided as a method, a system, or a computer program product. Therefore, the embodiments of the present disclosure may use a form of hardware only embodiments, software only embodiments, or embodiments with a combination of software and hardware. Moreover, the embodiments of the present disclosure may use a form of a computer program product that is implemented on one or more computer-usable storage media (including but not limited to a magnetic disk memory, a CD-ROM, an optical memory, and the like) that include computer-usable program code.

It can be understood that those embodiments described in the embodiments of the present disclosure can be implemented by hardware, software, firmware, middleware, microcode, or a combination thereof. For implementation with hardware, the processing unit may be implemented in one or more application specific integrated circuits (ASIC), a digital signal processor (DSP), a digital signal processing device (DSP Device, DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For implementation by software, technologies described in the embodiments of the present disclosure may be implemented by executing function modules (for example, a process and a function) in the embodiments of the present disclosure. Software codes can be stored in the memory and executed by the processor. The memory can be implemented inside or outside the processor.

The embodiments of the present disclosure are described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. Those computer program instructions can be provided to a general-purpose computer, a special-purpose computer, an embedded processor, or a processor of another programmable data processing device to generate a machine, so that an apparatus configured to implement functions specified in one or more procedures of a flowchart and/or one or more blocks of a block diagram is generated by using the instructions executed by the computer or the processor of the another programmable data processing device.

Those computer program instructions can also be stored in a computer readable memory that can guide a computer or another programmable data processing device to work in a specific manner, so that the instructions stored in the computer readable memory generate a product including an instruction apparatus. The instruction apparatus implements functions specified in one or more procedures of a flowchart and/or one or more blocks of a block diagram.

Those computer program instructions can also be loaded into a computer or another programmable data processing device, so that a series of operation steps are executed on the computer or the another programmable device to generate processing implemented by the computer, and the instruction executed on the computer or the another programmable device provide steps of functions specified in one or more procedures of a flowchart and/or one or more blocks of a block diagram.

Obviously, a person skilled in the art can make various modifications and variations to the embodiments of the present disclosure without departing from the spirit and scope of the present disclosure. In this way, the present disclosure is intended to include these modifications and variations of the embodiments of the present disclosure provided that they fall within the scope of the claims of the present disclosure and their equivalent technologies.

What is claimed is:

1. A measurement method, applied to a terminal, wherein the method comprises:
   receiving a threshold of a measurement quantity configured by a network device, wherein the threshold of the measurement quantity comprises a first threshold; and
   determining to measure a target neighboring cell of which a priority of an inter-RAT frequency and/or a priority of an adjacent frequency are/is higher than a priority of a frequency of the cell in which the terminal is located, when the value of the measurement quantity of the cell in which the terminal is located is less than the first threshold.

2. The method according to claim 1, wherein after the determining to measure a target neighboring cell, the method further comprises:
   searching for the target neighboring cell, and measuring all or a first preset number of target neighboring cells found through searching.

3. The method according to claim 1, wherein that the value of the measurement quantity of the neighboring cell is greater than or a fifth threshold comprises at least one of the following:
   values of a measurement quantity of a sixth preset number or all of neighboring cells in a neighboring cell list are greater than the fifth threshold;
   a number of neighboring cells whose values of a corresponding measurement quantity are greater than the fifth threshold is greater than a seventh preset number;
   in a first preset time, values of a measurement quantity of an eighth preset number or all of neighboring cells in a neighboring cell list are greater than the fifth threshold; and
   in a second preset time, a number of neighboring cells whose values of a corresponding measurement quantity are greater than the fifth threshold is greater than a ninth preset number.

4. The method according to claim 1, wherein the receiving a threshold of a measurement quantity configured by a network device comprises:
   receiving, by using information carried in a broadcast message, a system message, a dedicated radio resource control (RRC) message, or a physical downlink control channel (PDCCH), the threshold of the measurement quantity configured by the network device.

5. The method according to claim 1, wherein before the determining to measure a target neighboring cell, the method further comprises:
   receiving information that is related to a preset number of neighboring cells and/or a preset neighboring cell group and that is configured by the network device.

6. The method according to claim 5, wherein the receiving information that is related to a preset number of neighboring cells and/or a preset neighboring cell group and that is configured by the network device comprises:
   receiving, by using information carried in a broadcast message, a system message, a dedicated RRC message, or a PDCCH, the information that is related to the preset number of neighboring cells and/or the preset neighboring cell group and that is configured by network device.

7. A configuration method applied to a network device, wherein the method comprises:
   configuring a threshold of a measurement quantity for a terminal, so that the terminal determines to measure a target neighboring cell of which a priority of an inter-RAT frequency and/or a priority of an adjacent frequency are/is higher than a priority of a frequency of the cell in which the terminal is located, when the value of the measurement quantity of the cell in which the terminal is located is less than a first threshold, wherein the threshold of the measurement quantity comprises the first threshold.

8. The method according to claim 7, wherein the configuring a threshold of a measurement quantity for a terminal comprises:
   configuring a threshold of a measurement quantity for a terminal by using information carried in a broadcast message, a system message, a dedicated radio resource control (RRC) message, or a physical downlink control channel (PDCCH).

9. The method according to claim 7, wherein before or after the configuring a threshold of a measurement quantity for a terminal, the method further comprises:
   configuring information related to a preset number of neighboring cells and/or a preset neighboring cell group.

10. The method according to claim 9, wherein the configuring information related to a preset number of neighboring cells and/or a preset neighboring cell group comprises:
   configuring, by using information carried in a broadcast message, a system message, a dedicated RRC message, or a PDCCH, information related to a preset number of neighboring cells and/or a preset neighboring cell group.

11. A network device, comprising a processor, a memory, and a program stored in the memory and executable on the processor, wherein the program, when executed by the processor, implements the steps of the configuration method according to claim 7.

12. A terminal, comprising a processor, a memory, and a program stored in the memory and executable on the processor, wherein the program, when executed by the processor, the processor is configured to implement:
   receiving a threshold of a measurement quantity configured by a network device, wherein the threshold of the measurement quantity comprises a first threshold; and
   determining to measure a target neighboring cell of which a priority of an inter-RAT frequency and/or a priority of an adjacent frequency are/is higher than a priority of a frequency of the cell in which the terminal is located, when the value of the measurement quantity of the cell in which the terminal is located is less than the first threshold.

13. The terminal according to claim 12, the processor is further configured to implement:
   searching for the target neighboring cell, and measuring all or a first preset number of target neighboring cells found through searching.

* * * * *